United States Patent [19]

Flaum

[11] Patent Number: 4,464,569
[45] Date of Patent: Aug. 7, 1984

[54] METHOD AND APPARATUS FOR SPECTROSCOPIC ANALYSIS OF A GEOLOGICAL FORMATION

[75] Inventor: Charles Flaum, Danbury, Conn.

[73] Assignee: Schlumberger Technology Corporation, New York, N.Y.

[21] Appl. No.: 275,093

[22] Filed: Jun. 19, 1981

[51] Int. Cl.³ .............................................. G01V 5/10
[52] U.S. Cl. .................................... 250/270; 250/269
[58] Field of Search ..................... 250/270, 252.1, 262, 250/269; 356/300, 311

[56] References Cited

U.S. PATENT DOCUMENTS

| | | | |
|---|---|---|---|
| 3,371,574 | 3/1968 | Dwyer ................................ | 356/301 |
| 3,721,960 | 3/1973 | Tinch et al. ........................... | 73/152 |
| 3,780,301 | 12/1973 | Smith, Jr. et al. . | |
| 3,780,302 | 12/1973 | Arnold et al. ....................... | 250/270 |
| 3,928,763 | 12/1975 | Scott ................................... | 250/270 |
| 3,930,153 | 12/1975 | Scott ................................... | 250/262 |
| 3,930,154 | 12/1975 | Scott ................................... | 250/270 |

FOREIGN PATENT DOCUMENTS

| | | | |
|---|---|---|---|
| 2056060 | 8/1979 | United Kingdom ................ | 250/270 |
| 569070 | 4/1978 | U.S.S.R. ........................... | 250/252.1 |

OTHER PUBLICATIONS

Westaway, "The Gamma Spectrometer Tool Inelastic and Capture Gamma-Ray Spectroscopy for Reservoir Analysis", conference of Soc. of Petro. Engineers, Dallas, Sep. 21-24, 1980.

Hertzog, "Laboratory and Field Evaluation of an Inelastic-Neutron-Scattering and Capture Gamma Ray Spectroscopy Tool", conf. Soc. Petro. Engineers of AIME, Houston, Oct. 1-3, 1978.

*Primary Examiner*—Alfred E. Smith
*Assistant Examiner*—Carolyn E. Fields
*Attorney, Agent, or Firm*—Stephen L. Borst

[57] ABSTRACT

Earth formations surrounding a well borehole are analyzed by obtaining a series of capture gamma ray spectra representative of the interaction of thermal neutrons with various chemical elements in the formation surrounding a borehole. The capture gamma ray spectra are used to determine spectral elemental yields quantitatively indicative of the relative abundance of various chemical elements present in the formation. These yields are recorded as a function of depth in said borehole to produce a plurality of traces. The relative sensitivities of the logging tool to a number of the formation components, such as sandstone and limestone, are predetermined either from tool responses in the borehole plus core measurements or from tool responses in a laboratory formation plus the known makeup of the laboratory formation. The volume fractions of the formation components surrounding the well borehole are then determined from the spectral elemental yeilds and the predetermined relative sensitivities and are recorded as a function of depth to generate a tangible record which graphically illustrates the formation lithology.

18 Claims, 4 Drawing Figures

METHOD AND APPARATUS FOR SPECTROSCOPIC ANALYSIS OF A GEOLOGICAL FORMATION

BACKGROUND OF THE INVENTION

1. Field of Invention

The present invention relates in general to nuclear well logging, and pertains in particular to improved methods and apparatus for spectroscopic analysis of capture gamma ray energy spectra to provide information regarding the lithology of earth formations surrounding a well borehole.

2. The Prior Art

Various techniques have been utilized in the past to irradiate a geological formation with neutrons and to detect and process the resultant gamma ray energy spectra for borehole elemental constituent analysis. At its most fundamental level, such an analysis of capture gamma spectra reveals information concerning the presence of hydrogen, silicon, calcium, chlorine, sulfur and iron.

The derivation of such information depends upon an accurate constituent analysis of the formation gamma ray spectra. An important and basic technique for performing such an analysis is disclosed in U.S. Pat. No. 3,521,064, issued on July 21, 1970, to Moran, et al. In accordance with the Moran et al. teaching, a detected gamma ray energy spectrum derived from a formation of unknown composition by a spectroscopy logging tool is compared with a composite spectrum made up of weighted laboratory-derived, standard spectra of the constituents postulated to comprise the formation. The weight coefficients for the standard spectra which give the best fit of the composite spectrum to the unknown spectrum, as determined, for example, by the method of least squares, represent the relative proportions of the constituents in the formation. By appropriate selection and weighting of the standard spectra, the proportions of the constituents of interest may be obtained, from which the desired information regarding oil content may be derived.

An improvement over the Moran et al. technique is described in U.S. Pat. No. 4,055,763 issued to Stephen Antkiw on Oct. 25, 1977 and assigned to the assignee of the present invention, in which the spectroscopic technique is improved by providing a method and means for optimally gating the gamma ray detection periods relative to the neutron pulses in accordance with measured decay times of the thermal neutrons in the formation. In addition, that patent discloses a technique and means for controlling both the duration and repetition rate of the neutron pulses as a function of the measured decay times to provide an overall optimized decay time-spectroscopy operating cycle. Furthermore, that patent proposes that qualitative indicators of formation lithology, salinity, porosity and shaliness may be derived by taking the ratios of various combinations of the relative elemental contributions to the capture gamma ray spectra. Finally, knowledge of the thermal neutron decay time permits the determination of the formation macroscopic neutron absorption cross-section, $\Sigma$.

A further improvement to the spectroscopic logging techniques advanced in the Moran and Antkiw patents is described in copending U.S. Patent Application Ser. No. 187,123 by Grau, et al., now U.S. Pat. No. 4,394,574, entitled "Methods and Apparatus for Constituent Analysis of Earth Formations" in which a technique is advanced by which the spectroscopic analysis is substantially improved through the convolution of the elemental standard spectra in order to account for the degrading effects on detector resolution resulting from the high temperature borehole logging environment.

These prior patents and application illustrate the basic principles involved in determining the relative percent contributions to the detected spectra due to the presence of certain elements in the subsurface geological formation. While this information is of great interest and of high value, it would also be of interest to determine information directly related to the relative volume fractions of commonly encountered basic formation components such as limestone, sandstone, porosity, dolomite, etc. which contain one or more of the elements measured by the spectroscopic techniques proposed by the above discussed patents.

U.S. Pat. Nos. 3,928,763; 3,930,153; and 3,930,154, all issued to H. D. Scott, utilize a weighted least squares spectral fitting technique similar to that described in the Moran patent for obtaining relative elemental yields of elements contributing to a spectrum. Information bearing on the macroscopic neutron absorption cross section is then used in a processing technique which derives further information relating to the volume fractions of the basic formation components such as sandstone, limestone, etc.

While the techniques of the Scott patents are useful, they depend on rather complicated calculations necessitated by the various corrections and compensations necessary to produce a valid result. One such compensation is embodied in a function dependent on formation macroscopic neutron absorption cross section, called the "Compensating Function" ($f(\Sigma)$), which compensates for the time dependence of the actual gamma ray count upon the neutron capture cross section but which fails to take into account the spatial dependence of the neutron flux distribution which can be expected to vary from formation to formation in proportion to, among other things, the porosity of the formation and the neutron absorption cross section of the formation itself. In other words, the Scott "Compensating Function" might be expected to be correct only for formations of constant makeup and constant porosity.

Additionally, the Scott technique of determining formation component volume fractions requires detailed knowledge of the microscopic neutron capture cross sections for the various elements expected to be encountered, as well as the absolute values of so-called "calibration constants", ($G_i$) defined by source-detector configuration, the neutron source strength, and the portion of the gamma-ray spectrum to be analyzed. Therefore, a clear and straightforward technique which is not prone to the lengthy computations and accompanying uncertainties inherent in the technique of the Scott patents is desired.

SUMMARY OF THE INVENTION

The present invention overcomes the disadvantages of the Scott technique of determining basic formation component volume fractions by adopting an approach which does not require specific knowledge of neutron flux dependent compensation functions, detailed knowledge of energy dependent microscopic neutron capture cross-sections for the various chemical elements, or knowledge of flux magnitude and distribution. In a preferred embodiment, relative spectral elemental yields indicative of the presence of chemical elements in the formation are obtained from a spectroscopic analysis of capture gamma ray spectra obtained from a neutron spectroscopy logging tool. The relative sensitivities of the logging tool to the specific minerals or to the chemical elements in the formation are determined either from core analyses or from tests run in known formations. The spectral elemental yields and the relative sensitivities are then used together to determine the volume fractions of the basic formation components such as limestone, sandstone, porosity, salinity, dolomite, anhydrite, etc. Finally, the determined volume fractions are recorded on a storage medium in such a manner as to improve comprehension of the oftentimes complicated formation lithologies.

BRIEF DESCRIPTION OF THE DRAWINGS

The present invention may be better understood and its numerous objects and advantages will become apparent to those skilled in the art by reference to the accompanying drawings in which.

DETAILED DESCRIPTION

Figure 1:
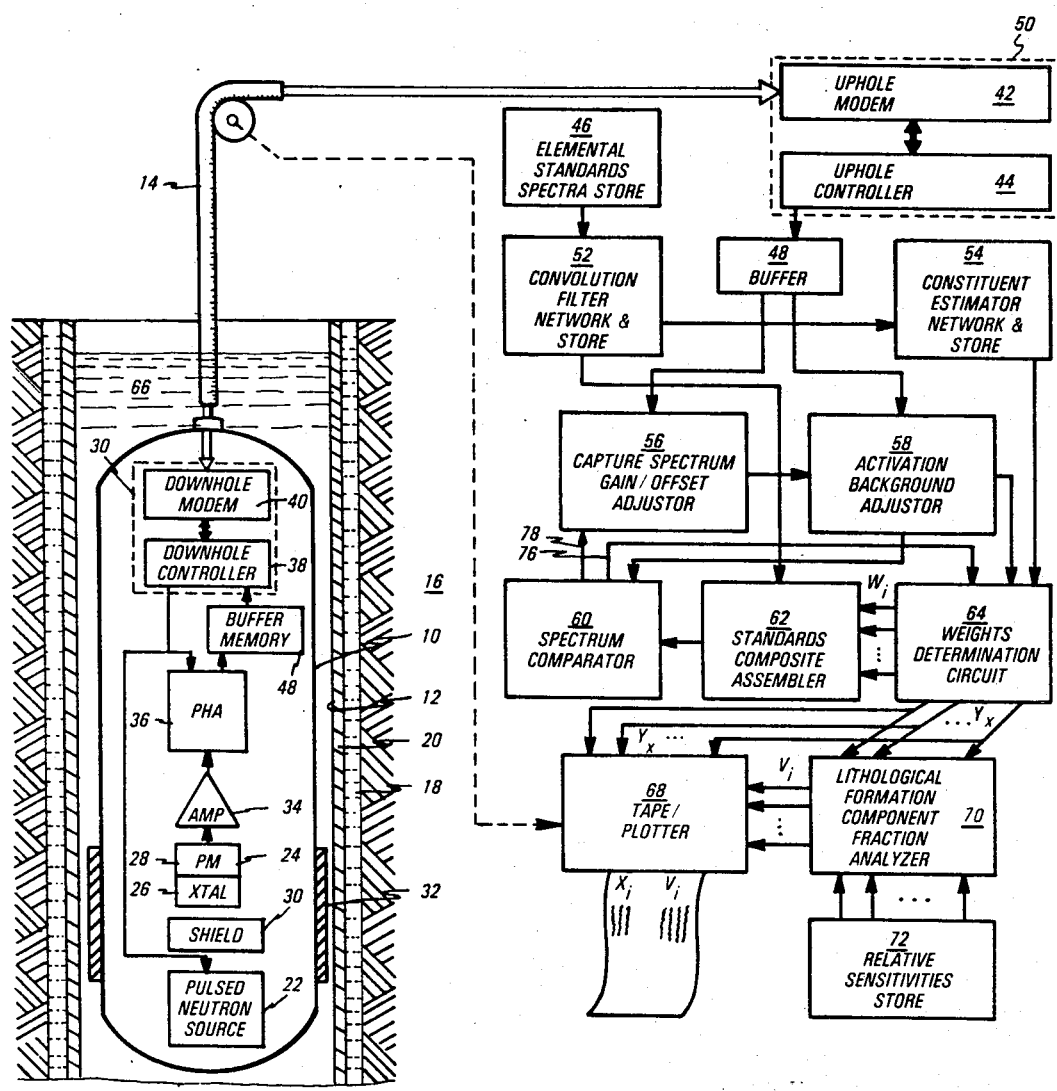
FIG. 1 is a schematic view of an embodiment of a logging apparatus that may be utilized in the practice of the invention.

While the invention is susceptible of various modifications and alternative constructions, there is shown in the drawings, and there will hereinafter be described in detail, a description of the preferred or best known mode of the invention. It is to be understood, however, that the specific description and drawings are not intended to limit the invention to the specific form disclosed. On the contrary, it is intended that the scope of this patent include all modifications and alternative constructions thereof falling within the spirit and scope of the invention as expressed in the appended claims, to the full range of their equivalents.

Referring now to FIG. 1, a representative embodiment of the invention includes a fluid tight, pressure and temperature resistant well tool or sonde 10 that is adapted to be suspended in a well bore 12 by an armored cable 14 for investigating a subsurface earth formation 16. The well bore 12 is illustrated as cased, including the usual annulus of cement 18 and steel casing 20, and as containing a well fluid 66. It will be understood that the invention as described but with appropriate adjustments also has application to openhole logging.

The sonde 10 includes a 14 Mev pulsed neutron source 22 for producing primary neutron radiation for the irradiation of the formation, and a radiation detector 24 for the detection of secondary gamma ray radiation returning from the formations. The neutron source 22 preferably is of the accelerator type described in U.S. Pat. Nos. 3,461,291 to C. Goodman and 3,546,512 to A. H. Frentrop, both of which are commonly owned with this application. This type of neutron source is particularly adapted to generate discrete bursts of high energy or fast neutrons, e.g. at 14 MeV, of controlled duration and repetition rate.

The detector 24 may be of any construction appropriate to the detection of gamma rays and to the production of a pulse signal in response to each detected gamma ray having an amplitude representative of the energy of the detected gamma ray. Generally, such a detector includes a scintillation crystal 26 which is optically coupled to a photomultiplier tube 28. The crystal is preferably of the thallium-activated sodium iodide type, although any suitable crystal such as thallium- or sodium-activated cesium iodide, may be used. Alternatively, a solid state detector, having for example a germanium crystal, might be employed. A neutron shield 30 may be positioned between the source 22 and the detector 24 to reduce bombardment of the detector by neutrons emanating directly from the source.

Electrical power for the sonde 10 is supplied through the cable 14 from a power source (not shown) at the surface. Suitable power sources (also not shown) are also included in the sonde 10 for the purpose of driving the nuetron source 22, the detector 24 and other downhole electronics. The sonde 10 may be surrounded by a boron carbide impregnated sleeve 32 located generally in the region of the source 22 and detector 24. The sleeve 32 acts as a shield to minimize the detection of gamma radiation originating from the neutron interactions in the immediate vicinity of the source and the detector. An amplifier 34 acts on the output pulses from the photo-multiplier 28. The amplified photo-multiplier pulses are thereafter applied to a pulse height analyzer (PHA) 36, which may be of any conventional type such as a single ramp (Wilkinson rundown) type. It will be understood to include the usual pulse height discriminators, for selecting the gamma ray energy range to be analyzed, and linear gating circuits, for controlling the time portion of the detector signal train to be analysed.

Pulse height analyzer 36 segregates the detector pulses into predetermined channels according to their amplitude to provide an energy spectrum and supplies signals in suitable digital form representing the amplitude of each analyzed pulse. The digital outputs of PHA 36 are stored in a buffer memory 48 from which they are periodically read out, on demand, by a communications system consisting generally of a downhole communications cartridge 30, the logging cable 14 and a companion uphole communications system 50. The combined communications system is a duplex digital system capable of transmitting data uphole from sonde 10 simultaneously with the transmission of control commands downhole to sonde 10 from a surface control system (not shown). One such communications system is fully described in copending U.S. Patent Application Ser. No. 63,666, now U.S. Pat. No. 4,355,310 entitled "Well Logging Communication Systems", filed Aug. 6, 1979, by A. Belaigues, et al. and assigned to the assignee of the present invention. Briefly, the downhole controller 38 organizes the transmission of data in both directions, causing the incoming control signals to be delivered to the proper functional elements and requesting and dispatching outgoing sonde-derived data via downhole modem 40 in a multiplexed mode. At the surface the signals are received by the uphole communications system 50 consisting of an uphole modem 42 which receives the data and transfers it to the uphole controller 44 which transmits the data to a buffer memory 48 as well as to other functional elements (not shown) as needed.

The operation of the sonde 10 is controlled by control signals originated in a surface computer. These control signals are dispatched downhole by uphole controller 44 and uphole modem 42. The control signals are used to orchestrate the operation of the various elements of the sonde 10 such as the neutron source 22 and the PHA 36.

In response to the control signals, a pulsing circuit, not shown, generates a plurality of sharp fire pulses, thereby causing the source 22 to emit corresponding sharp bursts of fast neutrons. For purposes of constituent analysis of capture gamma ray spectra in accordance with the invention, the neutron bursts are preferably of an optimal duration and are repeated at short intervals that are adjusted in accordance with variations in the formation thermal decay time to provide satisfactory statistics in the spectrum analysis procedure. U.S. Pat. No. 4,055,763 issued Oct. 25, 1977 to Stephen Antkiw for "Neutron Characteristic and Spectroscopy Logging Methods and Apparatus" discusses such a technique in detail. Other control signals transmitted to the pulse height analyzer 36 enable linear gating circuits of the pulse height analyzer to operate the pulse height analyzer during a number of detection time periods for each neutron burst.

Since it is desirable, in spectral analysis techniques, to obtain as pure a capture gamma ray spectrum as possible, the presence of inelastic gamma ray background is avoided by pulsing the neutron source and by gating the detection of gamma rays so that the detection gate is not coincident with the neutron burst. Additionally, the spectroscopy tool is periodically operated so as to accummulate a background spectrum during a period of time following the decay of most of the thermal neutrons. This background spectrum, which contains primarily contributions from formation and tool material activation (such as the scintillator crystal activation) is subsequently subtracted from appropriately adjusted capture spectra so as to remove this interfering background component.

Signals representing the capture gamma ray spectra are assembled and stored in appropriate circuitry such as buffer memory 48 for subsequent utilization, which may take place in suitable analog circuitry or in a suitably programmed digital computer such as the PDP-11/34 computer manufactured by the Digital Equipment Corporation, Maynard, Mass.

Before describing in greater detail the particular steps performed in the preferred embodiment of the invention, it is instructive to generally discuss the underlying theory upon which the spectral fitting analysis is based.

The capture spectrum obtained with the multichannel analyzer, is recorded as a histogram. The abscissa is the energy axis which is divided into m equal-width energy intervals. (For typical NaI(Tl)-detector resolution, m=256 is sufficient.) The ordinate for the ith energy interval is the number of gamma-rays ($n_i$) accumulated for that energy interval.

In the following discussion, the spectra are represented as m-dimensional vectors, p. The components, $p_i$, of each vector are normalized such that the sum of the $p_i$'s is unity.

In general, a formation spectrum, p, can be described as a linear combination of a complete set of s standard descriptor spectra, $P^j$ (j=1, 2, . . . ,s). Each of these standard spectra may correspond to an element expected to be present in the formation.

The vectors for the standard spectra are mathematically represented by column vectors of an m by s spectra-descriptor matrix, $\rho$, such that $$P = \sum_{j=1}^{S} P^j X_j = \rho \cdot X \quad (1)$$

where X is a vector whose components are the spectroscopic-yield coefficients, $X_j$. Each $X_j$ represents the fractional contribution from the corresponding standard spectrum-descriptor vector, $P^j$, to the total measured spectrum, p. The most significant spectral-response functions required for the capture spectra are for elements, H, Si, Cl, Ca, Ns, Fe, and activation background.

The general problem of spectroscopy-logging analysis is to determine the yield coefficients, $X_j$, which represent the contribution of each element to the observed spectrum. Since matrix $\rho$ is not square (because m>s), it is not possible in general to invert $\rho$ in order to solve for X. Also, the measured spectrum, p, contains statistical errors which can be represented by including an error spectrum, $\epsilon$, in Eq. 1.

$$P = \sum_{j=1}^{S} P^j X_j + \epsilon = \rho \cdot X + \epsilon \quad (2)$$

By selecting a suitable positive symmetric weighting matrix, W, the weighted statistical error squared is $$\epsilon^T W \epsilon = (p - \rho \cdot X)^T W (p - \epsilon \cdot X) \quad (3)$$

where $\epsilon^T \epsilon$ is the transpose of $\epsilon$, and $\epsilon^T W \epsilon$ is a number which measures the overall error. The weighted-least-squares solution which minimizes the error in Eq. 3 is given by $$X = (\rho^T W \rho)^{-1} \rho^T W \cdot p \quad (4)$$

The choice of the weighting matrix determines the nature of the least-squares estimate. In order to avoid lengthy matrix inversions for each analysis, the estimate used for W is based on a typical spectrum.

Eq. 4 can be rewritten in the form $$X = E \cdot p \quad (5)$$

where $$E = (\rho^T W \rho)^{-1} T W \quad (6)$$

The matrix, E, consists of s row vectors, $E^j$, each associated with one of the elemental standard descriptor spectra, $P^j$. The vectors, $E^j$, are called linear estimators because the scalar product between the observed spectrum, p, and each of the vectors, $E^j$, gives the fractional contribution, or yield, $X_j$, of the jth element to the observed spectrum.

To generate the set of standard spectra, $P^j$, for use in the descriptor matrix, $\rho$, capture spectra are taken in special laboratory formations designed to emphasize the spectral contribution of each given element.

As discussed above, each standard leads to the generation of an associated linear estimator, $E^j$ whose shape reflects the character of the standard and the cross correlations between it and other standards. Thus, the estimator is a type of digital filter that extracts from the observed spectrum, p, the contribution from its associated standard spectrum. The estimators include both positive and negative components. The positive and negative components occur where a standard correlates and anti-correlates with one or more other standards since the estimator for a standard is derived such that it is as independent as possible from estimators for other standards.

Returning now to FIG. 1, the elemental standard spectra, originally obtained from known test formations, are held in store 46. When needed, the standard spectra are read out and degraded and stored in their convolved form by convolution filter network and store 52. Convolution filter network 52 and the process of degrading the elemental standard spectra are the subject of U.S. Patent Application Ser. No. 065,244, now abandoned, filed Aug. 9, 1979 by Grau et al., entitled, "Methods and Apparatus for Constituent Analysis of Earth Formations" assigned to the assignee of the present invention. Briefly, convolution filter network 52 causes the elemental standard spectra to be degraded in a manner which takes into account the effects of temperature on the detector resolution extant during the detection of the measured spectra. This process recognizes and takes advantage of the fact that a better spectral analysis can be accomplished by weighted least squares fitting of a fit spectrum, comprising a weighted composite of standard spectra, to the unknown spectrum when the fit spectrum has been degraded in a manner which simulates the degradation of the detector resolution caused by elevated temperatures experienced by the measuring apparatus. This is of utmost importance in the oil well logging application as the differences in temperature between the laboratory, where the standard spectra are derived, and the borehole environment can be quite extreme. Additional description of the convolution filter network and method will be omitted since it is not an essential part of the present invention.

The degraded standard spectra are next utilized to generate an equal number of constituent or linear estimators in constituent estimator network 54. The estimators which have been defined above as linear estimators whose scaler products with a spectrum give the fractional contributions or yields of specific elements to the observed spectrum are stored in element 54 so as to be available for subsequent process steps.

The next step in the process is illustrated in subsystem 56 in which an iterative search is performed to cause the capture spectrum to be modified with respect to gain and offset so as to minimize the difference between the capture spectrum obtained from the capture gate and the composite spectra assembled from the convolved elemental standard spectrum stored in element 52. A description of this technique is set forth in copending U.s. Patent Application Ser. No. 174,969, now abandoned, entitled "Spectroscopic Analysis with Background Compensation", by Grau and will not be repeated here for the sake of brevity.

When the best fit requirement has been met, the adjusted spectrum corresponding to the best fit is delivered to the activation background adjustor circuit 58, which then subtracts the activation background spectrum from the capture gross inelastic spectrum so as to eliminate activation background contributions to the capture spectrum. An alternative to this technique might be the inclusion of an activation background standard to be used in a manner similar to the other standard spectra in order to eliminate the activation background contributions from the derived spectral elemental yields.

Once the capture spectrum has been corrected for gain, offset, and activation background, the adjusted spectrum is transmitted to element 64 which also receives the constituent estimators stored in memory 54. Element 64, the weights determination circuit, multiplies each of the estimators with the adjusted capture spectrum to derive a plurality of trial weights $w_i$ which are subsequently used in element 62 to assemble a composite spectrum from the plurality of convolved standard spectra drawn from convolution filter network and store 52.

The assembled standard composite spectrum and the adjusted capture spectrum are then compared in spectrum comparator 60 and a value of goodness of fit derived. If the goodness of fit value which involves a determination of the least squares, is optimum, weights determination circuit 64 is instructed via communication line 76 to output its data to tape plotter 68, or some other recording device such as a magnetic tape drive. In this final form, the weights $w_i$ become the fractional contributions or relative spectral yields $Y_x$ of the various elements x. If the goodness of fit is not satisfactory, a control signal is sent from spectrum comparator 60 via communication line 78 to the capture spectrum gain/offset adjustor circuit 56 and the entire process is repeated with a different capture spectrum gain and/or offset. The above described process is iteratively repeated until an appropriate least squares fitting criterion (or some other acceptable criterion) is met.

Once the relative yields $Y_x$ of gamma rays resulting from interactions of neutrons with the different elements (isotopes) present in the formation have been determined, formation component volume fractions may be determined in functional element 70 called the lithological formation component fraction analyzer.

It has been found that each of the elemental spectral yields $Y_x$ can be associated with sedimentary minerals or formation basic components which are dominated by the corresponding elements (e.g. silicon=quartz). The yields are proportional to the product of the volume fractions of the minerals, the effective neutron flux, the microscopic thermal neutron capture cross-sections, the gamma-ray production and detection efficiency and the elemental concentration in the mineral.

In order to accomplish this association, core or laboratory data are used to calibrate relative tool sensitivities and in so doing, the effects of some unknowns can be minimized or eliminated to produce volume fractions of the formation basic components present in the formation. Once determined, the volume fractions may be recorded in a graphical lithological presentation. Furthermore, with additional information derived from other logs, the porosity volume fraction can be subdivided into effective and clay porosities, while clay may be subdivided into particular minerals such as chlorite and illite. It will be recognized that hydrogen is associated with matrix porosity, chlorine with saline water, silicon with sandstone and clay, calcium with limestone, iron with siderite or chlorite clay, sulfur with anhydrite or gypsum, and potassium with illite clay or K-feldspar, to name just a few. It has been found that this analysis and presentation can be an invaluable aid in geological formation analysis.

Due to the uncertainty in the source strength and the neutron distribution, it is difficult to extract quantitative information from the absolute gamma-ray yields.

Therefore, it should be understood that the spectral yields $Y_x$ represent only the fractions of the total spectrum contributed by each element. It is evident that further use of the results must take into consideration the relative nature of the spectral yields.

Before describing in greater detail the technique of determining formation basic component volume fractions from the elemental spectral yields and from core or laboratory data, it is of value to discuss some governing principles, which include both geology and physics, that are taken advantage of to practice the invention.

The gamma-ray yield $Y_x$ due to element X contained by the formation mineral $f(x)$ can be written as:

$$Y_x = a\sigma_x E_x C_{f(x)} V_{f(x)} \qquad (2.1)$$

where:
- a = neutron flux (normalized, if these are relative yields)
- $\sigma_x$ = microscopic thermal neutron capture cross-section of element X
- $E_x$ = number of gamma rays detected per neutron captured by element X
- $C_{f(x)}$ = concentration of element X in mineral $f(x)$, per unit volume
- $V_{f(x)}$ = volume fraction of mineral $f(x)$ The terms $\sigma_x$, $E_x$, and $C_{f(x)}$, fixed for each element and mineral, can be grouped into one term $S_{f(x)}$, defined as the sensitivity of the tool to the detection of gamma rays from element X, in mineral $f(x)$, i.e.:

$$S_{f(x)} = \sigma_x E_x C_{f(x)} \qquad (2.2)$$

so that $$Y_x = a S_{f(x)} V_{f(x)} \qquad (2.3)$$

A similar relationship equation can be written for each element with the exception that if a particular element exists in more than one mineral, the elemental yield can be expressed in terms of a sum of two factors: (1) the products of the tool sensitivity to the detection of gamma rays from an element in a mineral $f(x)$ and $g(x)$ and (2) the respective volume fractions ($V_{f(x)}$, $V_{g(x)}$) of minerals $f(x)$ and $g(x)$:

$$Y_x = a[S_{f(x)} V_{f(x)} + S_{g(x)} V_{g(x)} + \ldots] \qquad (2.4)$$

In this case it will be appreciated that the ratio of the sensitivities $S_{f(x)}$, $S_{g(x)}$ is given simply by the ratio of the corresponding concentrations:

$$\frac{S_{f(x)}}{S_{g(x)}} = \frac{C_{f(x)}}{C_{g(x)}} \qquad (2.5)$$

Such concentrations $C_{f(x)}$ and $C_{g(x)}$ are generally well known for most minerals and can be obtained from standard reference texts.

A final relationship that expresses the constraint that the sum of all volume fractions in the formation must be equal to one can also be written:

$$\sum_{i=1}^{n} V_{(i)} + \phi = 1 \qquad (2.6)$$

where $\phi$ is the porous volume, and $V_i$ is the volume fraction of mineral i.

In the present invention, it is proposed to take advantage of the fact that the ratio between two different sensitivities, say $S_{ss}$ (sandstone) and $S_{ls}$ (limestone) can be expressed in the form:

$$\frac{S_{ss}}{S_{ls}} = \frac{Y_{si}}{Y_{ca}} \times \frac{V_{ls}}{V_{ss}}. \qquad (2.7)$$

This ratio is substantially constant, largely independent of neutron source intensity and of total formation macroscopic absorption cross sections. Furthermore, each of the quantities on the right are determinable either from laboratory tests or by associating core analyses from calibration functions (giving $V_{ls}$ and $V_{ss}$) with the spectral yields ($Y_{si}$, $Y_{ca}$) at the depth corresponding to the position in the well calibration functions from which the analyzed core was extracted. Indeed, since the ratio of any two sensitivities is essentially constant despite tool-to-tool variations, well-to-well variations, variations in neutron source intensity, etc., it should be recognized that each sensitivity that one might expect to ever use can be related to each other sensitivity by a unique constant: the entire set of which need be determined only once. That is, there are a set of relations of the form $S_{ls} = K S_{ss}$ for each pair of formation components and for which K may be determined. This being the case, a calibration formation (having core) may be logged with the spectroscopy tool to determine relative spectral yields.

By taking appropriate combinations of the measured yields, normalizing to core data or laboratory measurements to obtain calibrated relative sensitivities, and by making use of the constraint that the sum of all volume fractions is unity, the values of the volume fractions can be found by solving the appropriate set of equations for the formation component volume fractions.

Figure 2:
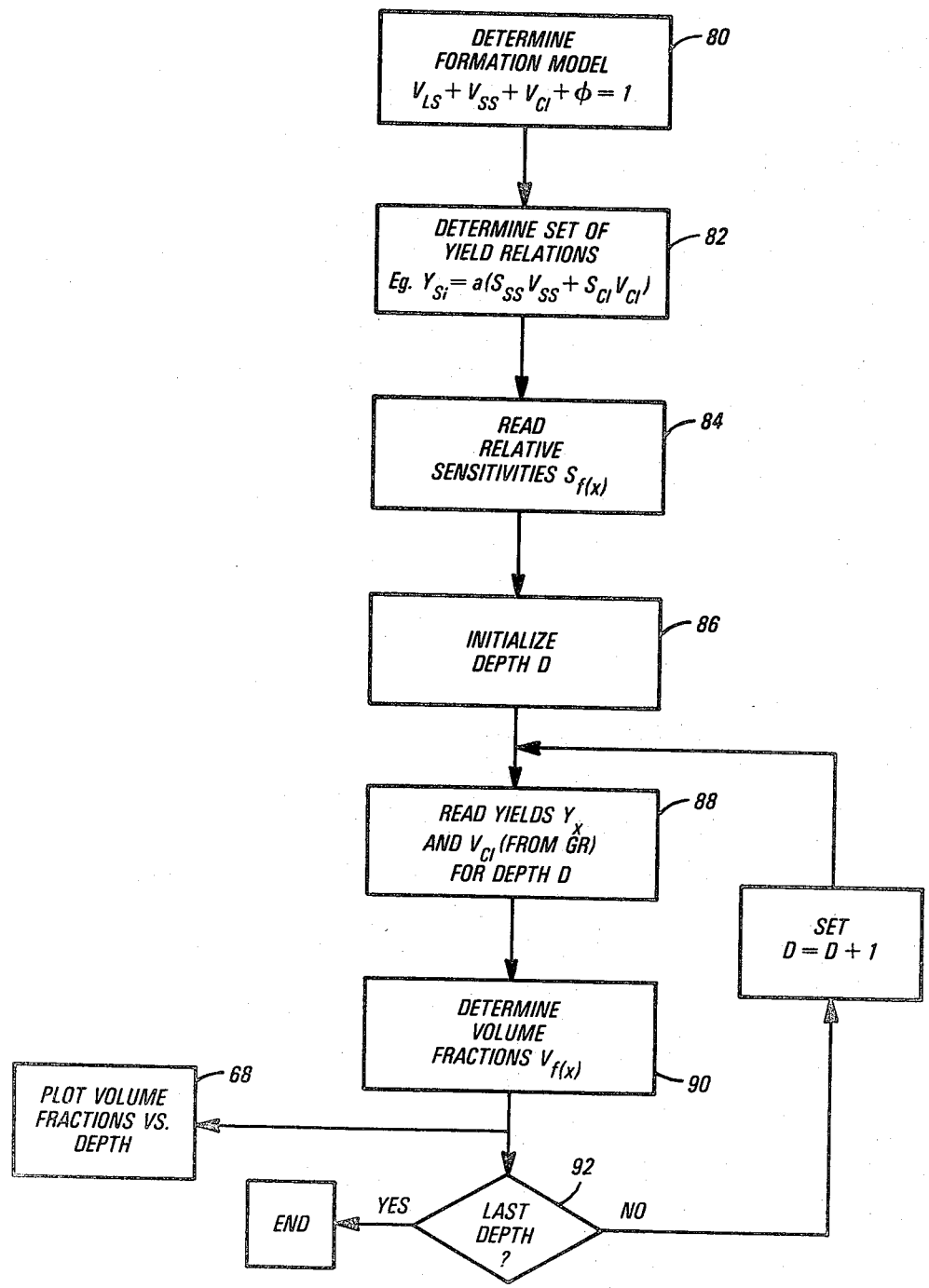
FIG. 2 is a flow diagram illustrating the operation of a portion of the system of FIG. 1.

Turning now to FIG. 2, an implementation of the invention will be set forth in further detail. FIG. 2 is a flow diagram illustrating in general terms the steps that are followed in functional element 70, which may be a suitably programmed digital computer.

Lithological formation component fraction analyzer 70 has as inputs the values of the spectral yields $Y_x$ as well as a set of relative sensitivities retrieved from relative sensitivities store 72. It should be evident from the previous discussion that the relative sensitivities stored in element 72 can be predetermined from either laboratory calibration or associating core data with the elemental yields derived from the core's position in the borehole. As a further alternative, the relative sensitivities may be determined from the equations of the form $S_{f(x)} = \sigma_x E_x C_{f(x)}$ although this is a more difficult undertaking since the quantity $E_x$ representing the number of gamma rays detected per neutron captured by element x is not easily obtained.

The first step of the process is to determine the geological model that applies to the formation to be analyzed. It will be recognized by those skilled in the art that one well borehole will usually traverse a number of intervals having different geology and therefore different lithologies. For example, one interval may contain a silicate (sandstone) sequence while another interval may contain a carbonate (limestone) sequence. Each of these intervals or formations consequently would be described by a different geological or lithological model. In the first case, the basic formation components may be sandstone, limestone, clay and porosity (the sum of the volume fractions of which equal 1), while in the second case the basic formation components may be limestone, dolomite and porosity (whose volume fractions also equal 1). One means of determining the appropriate formation model is to examine core extracted from the interval. Where core is not available, one may determine the appropriate model from a priori information available from the known geology of the region or from correlation to adjacent wells in which the formations are known or from examination of drilling cuttings. Clearly, the spectral elemental yields determined by the neutron spectroscopy tool for the interval may also be of great assistance in recognizing the presence or absence of the various possible minerals or basic formation components. Furthermore, it may be possible to examine the responses of other logging tools in order to determine the basic formation components.

Once this threshold step has been accomplished at element 80 of FIG. 2, the next step, illustrated at element 82, is to establish the yield relations between the spectral elemental yields $Y_x$ and the appropriate relative sensitivities and volume fractions. In most instances, there will be as many yield relationships as there are non-zero values of spectral elemental yields. As discussed previously, these yield relationships generally take the form of $Y_x = aS_{f(x)}V_{f(x)}$ or $Y_x = a[S_{f(x)}V_{f(x)} + S_{g(x)}V_{g(x)}]$.

Following the completion of this step, the appropriate predetermined values of the relative sensitivities are retrieved from memory at element 84 and are plugged into the already established yield relationships. Having completed these preliminary steps, the starting depth D is initialized at element 86 and the yields $Y_x$ for that depth as well as any other helpful information, such as $V_{clay}$ (determined from a gamma ray log, for example) are read at step 88. At this point, the predetermined sensitivities, the yields for the given depth, the yield relations and the formation model are all brought together and values for the volume fractions of the basic formation components at that depth are determined at element 90. This determination basically involves the straightforward solution of a number of simultaneous equations (the yield relations and the formation model equation) for a plurality of unknowns appearing in the simultaneous equations, the volume fractions. Having done so, the appropriate volume fractions are next either put into memory (for example, a magnetic storage tape) for subsequent conversion into a graphical representation or are output immediately to the plotter 68. Additionally, the system determines whether the last depth of interest has been reached or not at element 92 and if not, steps 88 and 90 are repeated for subsequent depths until the entire interval of interest has been analyzed.

EXAMPLE I

The above described technique has been applied to the lithological evaluation of a tight gas sand sequence in the Cotton Valley Group (Jurassic) in east Texas. In addition to an extensive logging suite, several intervals of core were available for laboratory analysis. Table 1 lists the properties of two core samples which were used to calibrate the sensitivities of the capture gamma spectroscopy tool.

TABLE I

GST SENSITIVITY CALIBRATION DATA

| MEASUREMENT | CORE SAMPLE NO. 1 | CORE SAMPLE NO. 2 |
|---|---|---|
| Core Values: | | |
| $V_{clay}$ (%) | 65 | 5 |
| $\phi_{TOTAL}$ (%) | 20 | 0 |
| $V_{ls}$ (%) | ~2 | 48 |
| $V_{ss}$ (%) | 13 | 47 |
| Fe (weight %) | 1.5 | * |
| B (ppm) | 105 | * |
| GST Yields: | | |
| Si | 0.39 | 0.27 |
| Ca | 0.15 | 0.55 |
| H | 0.18 | 0 |
| Fe | 0.10 | 0.04 |

*Not Measured

The formations present in this sequence can be described reasonably well within the sandstone-limestone-clay-porosity model, described by the relation:

$$V_{ss} + V_{ls} + V_{clay} + \phi = 1 \tag{3.1}$$

where $\phi$ stands for total porosity.

In this example, the macroscopic thermal neutron capture cross-section $\Sigma$ was used as a clay indicator. Values of $\Sigma$ may be provided from other logs made in the same well or may be available from the nuclear spectroscopy logging tool measurement of $\tau$ according to the principles and techniques described in the U.S. Pat. No. 3,971,935 issued to William B. Nelligan dated July 27, 1976. The relation used, as a first approximation, was:

$$V_{clay} = 0.035(\Sigma - 11.5) \tag{3.2}$$

Another clay indicator that may be used is the relationship $$V_{cl} = \frac{GR - GR_{clean}}{GR_{shale} - GR_{clean}}$$

where GR is the natural gamma ray signal at the depth of interest, $GR_{clean}$ is the natural gamma ray signal from a known clean sand in the well and $GR_{shale}$ is the natural gamma ray signal for a known shale in the well. A natural gamma ray logging tool is described in U.S. Pat. No. 2,749,446 issued June 5, 1976 to Herzog. As a third alternative, where appropriate, $V_{cl}$ may be found from the spectral yield equation for iron:

$$Y_{Fe} = aS_{clay(Fe)}V_{clay}$$

The boron concentration found in core sample 1 (see Table 1) accounts to a large extent for the measured $\Sigma$, confirming its usefulness as a clay indicator for this sequence. A small effect on $\Sigma$ due to chlorine present in the salt water in the porosity can be minimized by using the chlorine yield, as will be shown below.

The set of equations relating the calcium, hydrogen, and silicon yields to formation component volume fractions and the respective sensitivites are as follows:

$$Y_{Ca} = aS_{ls}V_{ls} \tag{3.3}$$

$$Y_H = aS_\phi \phi \tag{3.4}$$

$$Y_{Si} = a(S_{ss}V_{ss} + S_{clay}V_{clay}) \tag{3.5}$$

This last equation can be simplified by using the relationship $$\frac{S_{clay}}{S_{ss}} = \frac{C_{clay(si)}}{C_{ss(si)}}$$

and the knowledge that the average concentration of silicon in clays is universally about 40% of that in sandstone, with the result:

$$Y_{si} = aS_{ss}(V_{ss} + 0.4 V_{clay}) \qquad (3.6)$$

It can be seen that combining Equations (3.3), (3.4) and (3.6) gives:

$$\frac{Y_{Ca}}{aS_{ls}} + \frac{Y_H}{aS_\phi} + \frac{Y_{Si}}{aS_{ss}} = V_{ls} + \phi + V_{ss} + 0.4 \, V_{clay} \qquad (3.7)$$

or, using equation (3.1) and recombining:

$$\frac{\left(Y_{Ca}\left(\frac{S_{ss}}{S_{ls}}\right) + Y_H\left(\frac{S_{ss}}{S_\phi}\right) + Y_{Si}\right)}{aS_{ss}} = 1 - 0.6 \, V_{clay} \qquad (3.8)$$

The ratios of sensitivities in the equation (3.8) can be found by using the core analysis results (see Table 1). This involves solving equations (3.1), (3.3), (3.4), and (3.6), taking the values of the volume fractions from core data. The result is:

$$\frac{S_{ss}}{S_{ls}} = 0.5; \qquad (3.9)$$

$$\frac{S_{ss}}{S_\phi} = 1.10; \qquad (3.10)$$

leading to:

$$A = aS_{ss} = \frac{(Y_{Si} + .5 \, Y_{Ca} + 1.10 \, Y_H)}{(1 - .6 \, V_{clay})} \qquad (3.11)$$

and the volume fractions become:

$$V_{ss} = \frac{Y_{Si}}{A} - .4 \, V_{clay} \qquad (3.12)$$

$$V_{ls} = \frac{0.5 \, Y_{Ca}}{A} \qquad (3.13)$$

$$\phi = \frac{1.10 \, Y_H}{A} \qquad (3.14)$$

In fact, the volume fraction of any mineral ix, containing element x can not be given in general by:

$$V_{ix} = \left(\frac{S_{ss}}{S_{ix}}\right) \frac{Y_x}{A} \qquad (3.15)$$

where the ratio in brackets is obtained from calibration with core or other available data (such as chemical composition, etc.). The parameter A becomes, in this case, the aboslute normalization constant converting measured yields to volume fractions or elemental or mineral concentrations.

The generalized equation (3.15) can now be used to obtain more detail about the formation. The iron concentration, for example, is given by:

$$C_{fe} = \frac{20 \, Fe}{A} \qquad (3.16)$$

The chlorine concentration can be obtained in a similar way, and it in turn can be used to correct $V_{clay}$ from $\Sigma$, for chlorine capture, with the result:

$$V_{cl}(\text{corr}) = V_{cl} - 0.67 \left(\frac{Cl}{A}\right) \qquad (3.17)$$

The coefficient 0.67 was obtained empirically by correlating with other clay indicators.

Figure 3:
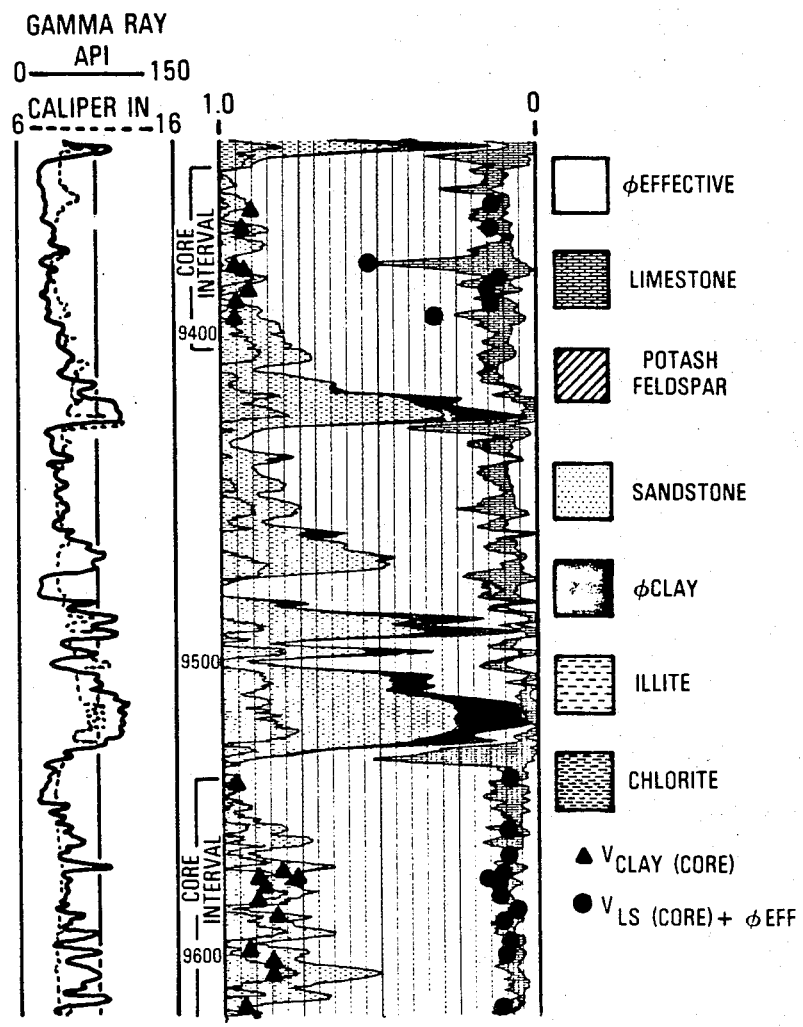
FIG. 3 is a graphical display of the analysis of the lithology of one well according to the principles and techniques of the present invention.

The results derived from the above analysis are shown in FIG. 3 over the regions of the well which were also cored. The presentation shows the formation divided into volume fractions of clay, sandstone, limestone and effective porosity derived from another clay interpretation technique not a part of this invention. The clay fraction is subdivided into chlorite and illite. This subdivision is based on the recognition of the association of potassium with illite but not with chlorite. Relative potassium yields may be determined from a natural gamma spectroscopy tool and technique of the type described in U.S. Pat. No. 3,976,878 to Chevalier, et al. issued Aug. 24, 1976, (on the basis of potassium concentration also derived from a logging technique not a part of this invention). Core data are indicated on these figures and they show good agreement with the log. The triangles indicate $V_{clay}$ (core), while the circles indicate $V_{ls}$(core)+$\phi$(effective).

EXAMPLE II

In a second example the method has been applied to a different lithological sequence.

Figure 4:
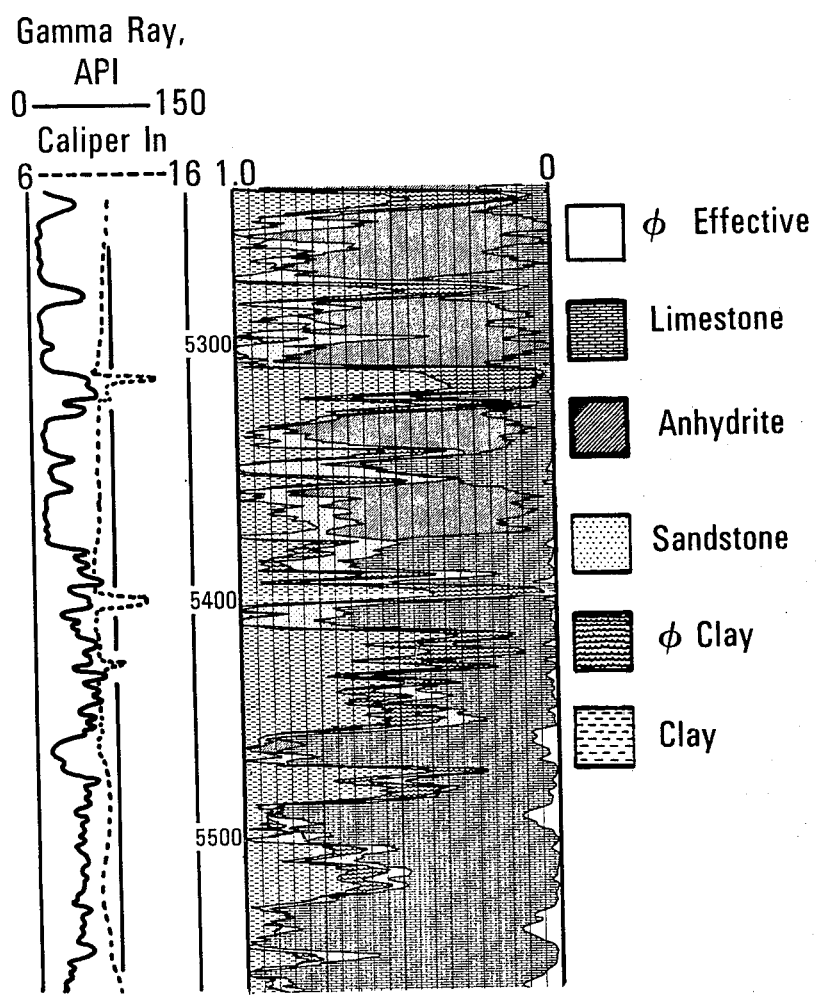
FIG. 4 is a second graphical display of the analysis of the lithology of a second example according to the principles and techniques of the present invention.

To make the analysis in this example, it is necessary to expand the set of yield equations in the previous example by adding the equation for the sulfur yield, which is proportional to the volume of anhydrite, and by modifying the calcium yield to account for the presence of calcium in both calcite and anhydrite. The lithological results of applying the analysis to this well sequence are illustrated in FIG. 4.

While a preferred embodiment of the invention has been described, it is evident that a broad variety of variations of its principles are possible. For example, the invention need not be limited to the capture gamma spectral yields available from the neutron spectroscopy logging tool. The analysis may also be applied to spectral yields available from the analysis of inelastic spectra, from natural gamma ray spectra as well as from activation spectra. Indeed, the techniques of the invention may find application wherever a spectrum is analyzed to produce relative spectral yields.

I claim:

1. A method for the analysis of earth formations surrounding a well borehole comprising the steps of:
   a. passing a spectroscopy logging tool through said borehole to obtain a series of spectra representative of the elemental composition of said formation;
   b. from said spectra, determining relative spectral elemental yields indicative of the presence of various chemical elements in said formation;

c. calibrating said spectroscopy logging tool to obtain a plurality of tool relative sensitivities indicative of the relative response of said logging tool to a plurality of formation basic components;

d. from said spectral elemental yields and said relative sensitivities, determining the volume fractions of said plurality of formation basic components and recording said volume fractions as a function of depth to generate a physical record.

2. The method as recited in claim 1 further including the step of recording said spectral elemental yields as a function of depth in said borehole to produce a plurality of traces indicative of relative elemental abundances in said earth formations.

3. The method as recited in claim 1 wherein said physical record comprises a lithological display of the formation in which said plurality of volume fractions are recorded adjacent to one another to produce a graphical representation.

4. The method as recited in claim 1 wherein said calibrating step includes the steps of analyzing core obtained from a calibration formation to determine calibration formation basic component volume fractions, and combining said calibration formation basic component volume fractions with relative spectral elemental yields obtained from said calibration formation by said spectroscopy tool at the depth from which said core was obtained to produce said relative sensitivities.

5. The method as recited in claim 1 wherein said calibrating step includes the steps of analyzing test formations to determine component volume fractions, and combining said component volume fractions with relative spectral elemental yields obtained from said test formations by said spectroscopy tool to produce said relative sensitivities.

6. The method as recited in claim 1 wherein said volume fractions determining step includes the step of determining a geological model to determine which formation basic components are expected to be present in the geological formation, each of which is strongly associated with one of the elements for which a relative yield has been obtained, and setting the sum of their volume fractions equal to one.

7. The method as recited in claim 6 wherein said volume fractions determining step includes the step of establishing a plurality of relationships, each of which relate a relative spectral elemental yield with one or more formation basic component volume fractions and the corresponding relative sensitivities.

8. A method for the analysis of a material comprising the steps of:
    a. from spectra obtained from a spectroscopy investigating tool, determining a plurality of spectral elemental yields indicative of the relative presence of a respective plurality of elements in said material;
    b. calibrating said spectroscopy investigating tool to obtain a plurality of tool relative sensitivities indicative of the relative response of said tool to a respective plurality of basic components of said material;
    c. from said spectral elemental yields and said relative sensitivities, determining the volume fractions of a plurality of said basic components.

9. The method as recited in claim 8 wherein said spectroscopy investigating tool is a geological formation logging tool and the step of determining the relative sensitivities includes the steps of analyzing core removed from a calibration formation to determine calibration formation basic component volume fractions, and combining said calibration formation basic component volume fractions with relative spectral elemental yields obtained from said calibration formation by said spectroscopy tool at the depth from which said core was obtained to produce said relative sensitivities.

10. The method as recited in claim 8 wherein said calibrating step includes the steps of analyzing test formations to determine test formation component volume fractions, and combining said test formation component volume fractions with relative spectral elemental yields obtained from said test formations by said spectroscopy tool to produce said relative sensitivities.

11. The method as recited in claim 8 further including the step of determining an element constituent model of basic components expected to be present in the material, each of which is strongly associated with one or more of the elements for which a relative yield has been obtained, establishing a basic component volume fraction relationship by setting the sum of the volume fractions equal to one and utilizing said volume fraction relationship in said volume fractions determining step.

12. The method as recited in claim 11 further including the step of establishing a plurality of relationships, each of which relate a relative spectral elemental yield with one or more basic component volume fractions and the corresponding relative sensitivities, and utilizing said plurality of relationships in said volume fractions determining step.

13. The method as recited in claim 8 further including the step of producing a tangible display of the material in which said plurality of volume fractions are recorded adjacent to one another to produce a graphical representation.

14. A method for the analysis of earth formations surrounding a well borehole comprising the steps of:
    a. passing a neutron spectroscopy logging tool through a borehole and deriving therefrom a plurality of capture gamma ray spectra;
    b. from said spectra, determining relative spectral elemental yields indicative of the relative presence of a plurality of elements in said earth formations;
    c. recording said relative spectral elemental yields as a function of depth to produce a plurality of traces indicative of relative elemental abundances in said earth formations;
    d. calibrating said spectroscopy logging tool to obtain a plurality of tool calibrated relative sensitivities indicative of the relative response of said logging tool to a plurality of formation basic components;
    e. determining a geological model of the formation to determine which formation basic components are expected to be present in the geological formation, each basic component being strongly associated with one of the elements for which a relative spectral elemental yield has been determined, and setting the sum of their volume fractions equal to one;
    f. establishing a plurality of relationships, each of which relate a relative spectral elemental yield with one or more formation component basic volume fractions and the corresponding relative sensitivities;
    g. from said spectral elemental yields and said calibrated relative sensitivities, determining the volume fractions of a plurality of formation basic components; and
    h. recording said volume fractions as a function of depth to generate a physical record.

15. The method as recited in claim 14 wherein said step of calibrating said spectroscopy logging tool includes the steps of analyzing core obtained from a calibration formation to determine calibration formation basic component volume fractions, and combining said calibration formation basic component volume fractions with relative spectral elemental yields obtained from said calibration formation by said spectroscopy tool at the depth from which said core was obtained to produce said relative sensitivities.

16. The method as recited in claim 14 wherein said calibrating step includes the steps of analyzing test formations to determine test formation component volume fractions, and combining said test formation component volume fractions with relative spectral elemental yields obtained from said test formations by said spectroscopy tool to produce said relative sensitivities.

17. A system for analysing earth formations surrounding a well borehole comprising:
   a. a spectroscopy logging system for determining spectral elemental yields indicative of the presence of elements in the formation;
   b. means for combining said spectral elemental yields with the relative sensitivities of said logging system to a plurality of formation basic components containing said elements to determine the volume fractions of a plurality of formation basic components.

18. A system for the analysis of earth formations surrounding a well borehole comprising:
   a. A neutron spectroscopy logging tool for obtaining a series of capture gamma ray representative of the interaction of thermal neutrons with various chemical elements in said formation upon passing through said borehole;
   b. means responsive to said capture gamma ray spectra for determining relative spectral elemental yields of gamma rays indicative of the presence of said various chemical elements in said formation;
   c. means for recording said spectral elemental yields as a function of depth in said borehole to produce a plurality of traces;
   d. means for combining relative tool sensitivities to the presence of a plurality of formation basic components containing said elements with said spectral elemental yields to determine the volume fractions of a plurality of said formation basic components; and
   e. means for recording said volume fractions as a function of depth to generate a tangible record.

* * * * *